United States Patent
Boday et al.

(10) Patent No.: US 10,329,380 B2
(45) Date of Patent: Jun. 25, 2019

(54) LACTIDE-DERIVED POLYMERS WITH IMPROVED MATERIALS PROPERTIES VIA POLYHEXAHYDROTRIAZINES (PHT) REACTION

(71) Applicant: International Business Machines Corporation, Armonk, NY (US)

(72) Inventors: Dylan J. Boday, Tucson, AZ (US); Jeannette M. Garcia, San Leandro, CA (US); James L. Hedrick, Pleasanton, CA (US); Brandon M. Kobilka, Tucson, AZ (US); Jason T. Wertz, Pleasant Valley, CA (US); Rudy J. Wojtecki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 15/597,932

(22) Filed: May 17, 2017

(65) Prior Publication Data

US 2018/0334536 A1  Nov. 22, 2018

(51) Int. Cl.
*C08G 63/91* (2006.01)
*C08G 63/685* (2006.01)

(52) U.S. Cl.
CPC ....... *C08G 63/912* (2013.01); *C08G 63/6852* (2013.01)

(58) Field of Classification Search
None
See application file for complete search history.

(56) References Cited

U.S. PATENT DOCUMENTS 9,376,404 B2   6/2016  Nakagawa et al.
2016/0297931 A1  10/2016  Boday et al.
2017/0029590 A1*  2/2017  Foley ................. C08G 8/38

FOREIGN PATENT DOCUMENTS

WO   2012168392 A1   12/2012

OTHER PUBLICATIONS

Britner et al., "Self-Activation of Poly(methylenelactide) through Neighboring-Group Effects: A Sophisticated Type of Reactive Polymer", Macromolecules 2015, 48,3516-3522.
Wertz et al., "Acrylic Platform from Renewable Resources via a Paradigm Shift in Lactide Polymerization", ACS Macro Letters 2016,5,544-546.

* cited by examiner

*Primary Examiner* — Ana L. Woodward
(74) *Attorney, Agent, or Firm* — Patterson + Sheridan, LLP

(57) ABSTRACT

A composition, comprising a poly(methylene lactide) polymer covalently linked to a hexahydrotriazine unit or a hemiaminal unit, and methods of making such a composition, are described herein. In one embodiment, the poly (methylene lactide) polymer comprises a plurality of poly (methylene lactide) chains, and at least a portion of the poly(methylene lactide) chains are cross-linked by one or more of the hexahydrotriazine units, the hemiaminal units, or a combination thereof.

17 Claims, No Drawings

LACTIDE-DERIVED POLYMERS WITH IMPROVED MATERIALS PROPERTIES VIA POLYHEXAHYDROTRIAZINES (PHT) REACTION

BACKGROUND

The present invention relates to polymers derived from renewable sources, and more specifically, to polymers for electronic applications derived from renewable sources.

There is considerable interest in the use of renewably-sourced polymers for electronic applications. Looming concerns about the stability of petroleum prices and its eventual depletion have resulted in rapid research and development in polymers and materials derived from renewable materials. Many major operators are recognizing benefits from incorporating biorenewable materials into existing products as a means to both reduce costs and environmental impact. While there has been some success in incorporating bio-based materials into products while maintaining industry standards and properties of those materials, there still exists a need to increase the renewable content further.

SUMMARY

A composition, comprising a poly(methylene lactide) polymer covalently linked to a hexahydrotriazine unit or a hemiaminal unit, and methods of making such a composition, are described herein. In one embodiment, the poly(methylene lactide) polymer comprises a plurality of poly(methylene lactide) chains, and at least a portion of the poly(methylene lactide) chains are cross-linked by one or more of the hexahydrotriazine units, the hemiaminal units, or a combination thereof.

In another embodiment, a composition, comprising a poly(methylene lactide) polymer covalently linked to a poly(hexahydrotriazine) polymer, a poly(hemiaminal) polymer, or a combination thereof, by an aromatic bridging group, and methods of making such a composition, are described.

In another embodiment, a method of making a material includes obtaining a poly(methylene lactide) polymer material; reacting the poly(methylene lactide) polymer material with a diamine material, a triamine material, or a combination thereof to form a monomer material; and reacting the monomer material with formaldehyde to form a cross-linked poly(methylene lactide) polymer.

DETAILED DESCRIPTION

This disclosure includes chemical structures that show atomic compositions of compounds and relative bonding arrangements of atoms in a chemical compound. Unless specifically stated, the geometric arrangement of atoms shown in the chemical structures is not intended to be an exact depiction of the geometric arrangement of every embodiment, and those skilled in the chemical arts will recognize that compounds may be similar to, or the same as, the illustrated compounds while having different molecular shapes or conformations. For example, the structures denoted herein may show bonds extending in one direction, while embodiments of the same compound may have the same bond extending in a different direction. Additionally, bond lengths and angles, Van der Waals interactions, isoelectronic structures, and the like may vary among instances of the same chemical compound. Additionally, unless otherwise noted, the disclosed structures cover all stereoisomers, conformers, rotamers, isomers, enantiomers, of the represented compounds.

Chemical structures may be identified herein using numbers, or numbers and letters, in parentheses. Chemical reaction schemes may be identified using numbers, or numbers and letters, in square brackets. Unless otherwise noted, chemical reactions are performed at ambient conditions or under slight heating with no special atmosphere or head space, and may be performed using standard organic solvents to manage mix properties such as viscosity and flow index.

This disclosure presents new polymers incorporating materials derived from renewable sources along with poly(hexahydrotriazine) ("PHT") portions. PHT is a polymer that can be made by reacting a diamine and/or triamine monomer with formaldehyde, in monomer or oligomer form, in solvent or excess amine monomer. PHT includes repeat units having the general structure

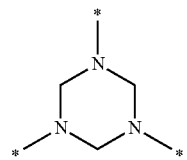

(1)

where each starred bond represents a covalent bond to other atoms in the polymer. The repeat units of structure (1) are hexahydrotriazine (HT) units that are joined by bridging groups having the general structure $$J\text{-}(*)_y \quad (2)$$

where y is 2 or 3 and J is a divalent or trivalent radical. That is to say the bridging groups of structure (2) are divalent or trivalent bridging groups. The starred bonds of the bridging groups of structure (2) represent covalent bond sites that connect at the starred bonds of structure (1), which are also covalent bond sites. Each starred bond of structure (2) is covalently bonded at a starred bond of structure (1), so that the starred bond of structure (2), together with the corresponding starred bond of structure (1), is a single covalent bond between a nitrogen atom of the HT unit and an atom of the bridging group.

The HT repeat unit of structure (1) is generally formed by reacting a primary amine having the structure $$J\text{-}(NH_2)_y \quad (3),$$

which is to say a diamine or triamine, with formaldehyde in monomer or oligomer form, for example paraformaldehyde, optionally in a solvent such as N-methylpyrrolidone (NMP), at a temperature of 20-120° C. for 1 minute to 24 hours to form an intermediate polyhemiaminal (PHA) material with repeat units having the general structure

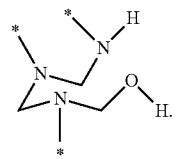

(4)

The structure (4) is a hemiaminal (HA) structure that is formed by partial ring formation among the monomers of structure (3) and the formaldehydes. The monomer of structure (3) reacts to become a bridging group having the structure (2), and each starred bond of the structure (2) is covalently bonded at a starred bond of structure (4), so that the starred bond of structure (2), together with the corresponding starred bond of structure (4), is a single covalent bond between a nitrogen atom of the HA unit and an atom of the bridging group. A material having structure (4) as a repeat unit connected by bridging groups of structure (2) is a polyhemiaminal (PHA) material.

The PHA material at this stage, formed in solvent or excess monomer, is a liquid with a viscosity that depends on the degree of polymerization and the amount of solvent and unreacted monomer present. The PHA material can be isolated and used as a polymer or as a gel. Solvent molecules may coordinate with the HA units of the PHA material to form a gel.

The PHA material may be heated to a temperature of 150-280° C. for 1 minute to 24 hours to complete the ring closure of the HA units and form the PHT described above.

The polymers of this disclosure include a first portion that is a PHT and/or PHA portion and a second portion that is a lactide-derived polymer, which may be made from renewable materials. The lactide-derived polymer is aminated to form a diamine, which can then participate in the ring-closure reaction described above to form a PHT/polylactide polymer.

A lactide polymer is generally derived from, or related to, lactic acid, which has the general structures

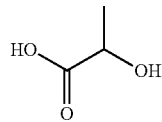
(5)

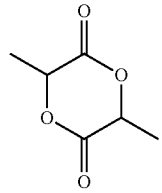
(6)

where structure (6) is the dimer form of structure (5). Lactic acid may be polymerized into poly(methylidenelactide) (PML), which is a derivative of lactic acid having the structure

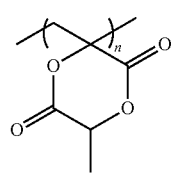
(7)

where n is an integer greater than 1. PML is made from methylidene lactide, which has the structure

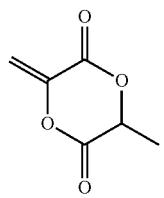
(8)

and is made by bromination and dehydrohalogenation of lactide (lactic acid dimer), as follows:

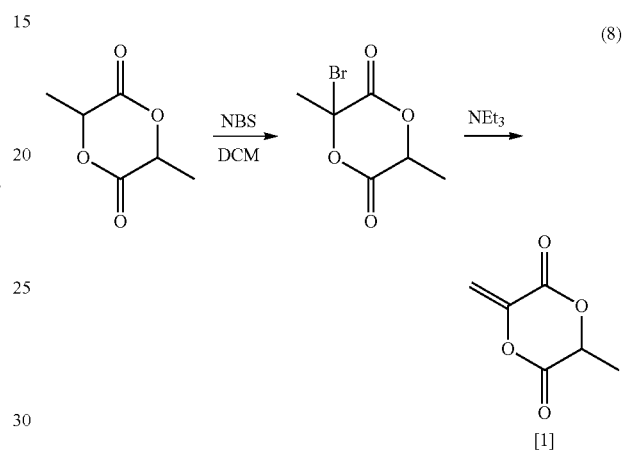
(8)

[1]

where NBS is N-bromosuccinimide, DCM is dichloromethane, and $NEt_3$ is triethylamine. Polymerization of methylidene lactide is done at nominal conditions in a solution of azobisisobutyronitrile (AIBN) to form structure (7).

PML can be incorporated in a poly(hexahydrotriazine) polymer ("PHT"), a poly(hemiaminal) polymer ("PHA"), or a mixed PHT/PHA polymer. The PML will react with an amine to form a monomer that can participate in the cyclization reaction described above to make a PHA or PHT polymer, as follows:

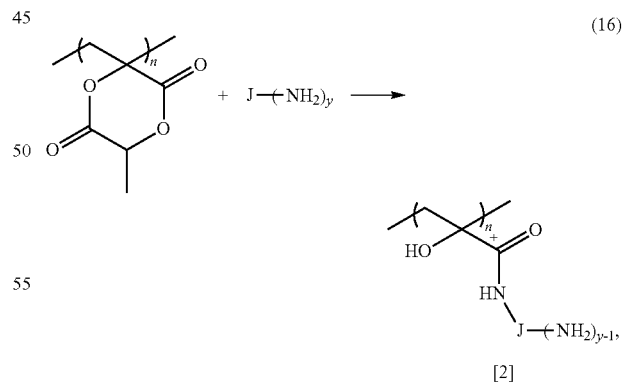
(16)

[2]

This reaction is typically performed in a THF/alcohol cosolvent, for example a 2:1 THF/methanol cosolvent mixture. Reaction [2] produces byproduct lactic acid, as the non-methylidenylated monomer of the dimer substituent of the PML debonds to be replaced by the amine. The resulting structure (16) is a polymer or oligomer with attached amine-functionalized groups that have a terminal primary amine group and a secondary amine group at the attachment point to the main polymer chain. If desired, the polymer resulting from reaction [2] can typically be isolated by removing solvent and excess monomers, under vacuum if necessary. Note that if y is 2, and the original primary amine is a diamine, structure (16) will be a polymer with pendant groups having one primary amine group and one secondary amine group. If y is 3, and the original primary amine is a triamine, structure (16) will be a polymer with pendant groups having two primary amine groups and one secondary amine group.

The polymers of structure (16) can be used as monomers to cyclopolymerize with a formaldehyde, as single molecule formaldehyde or oligomer paraformaldehyde, in an appropriate solvent such as NMP. In this way, the PHA/PHT reaction can be used to cross-link PML polymer chains, as follows:

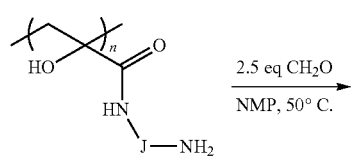

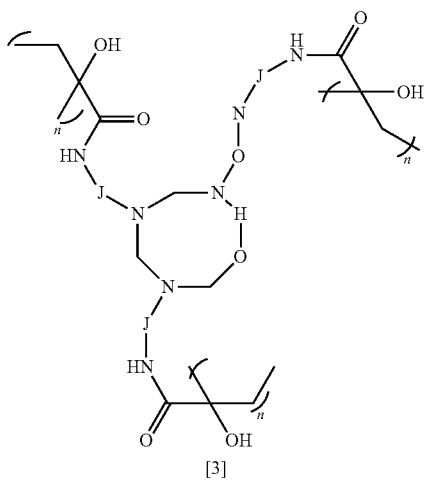

[3]

for the case where the bridging group J is divalent, and

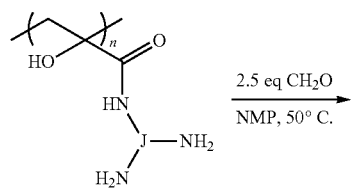

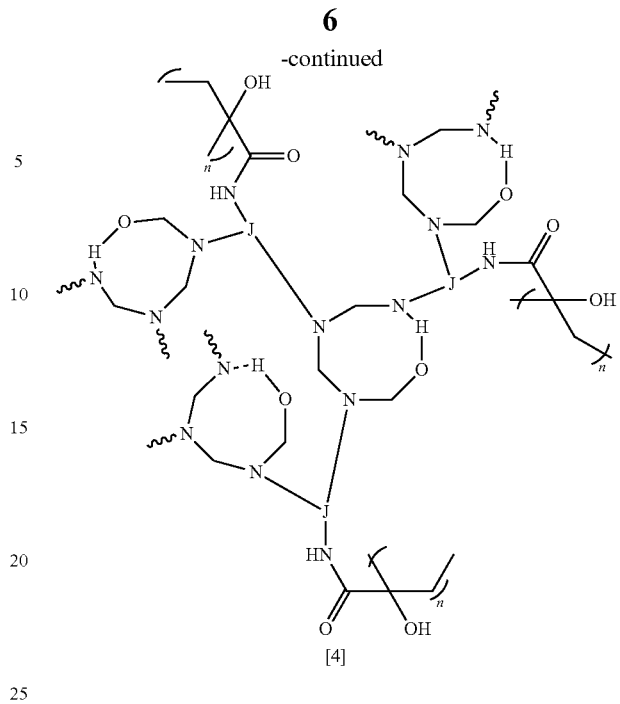

[4]

for the case where the bridging group J is trivalent. The wavy bonds in the product of reaction [4] indicate bonds to other structures, for example other PML chains, in the network. The structures resulting from reactions [3] and [4] include PML chains that can have different lengths, and therefore molecular weights. Expressed in terms of the structures shown in reactions [3] and [4], each instance of n can be a different integer.

The PHA structures of reactions [3] and [4] result when the reaction is performed at nominal temperatures, for example below about 80° C. Exemplary solvents that may be used for the PHA/PHT reaction include dipolar aprotic solvents such as, for example, N-methyl-2-pyrrolidone (NMP), dimethylsulfoxide (DMSO), N,N-dimethylformamide (DMF), N,N-dimethylacetamide (DMA), Propylene carbonate (PC), N-cyclohexyl-2-pyrrolidone (CHP), N,N'-dimethylpropyleneurea (DMPU), and propylene glycol methyl ether acetate (PGMEA). The PHA structures can be isolated if the solvent is subsequently removed under vacuum at low (i.e. ambient) temperature.

Further heating the result of reaction [3], for example by extending the heating time at a temperature as low at 80° C. or by increasing temperature up to about 200° C., yields a PHT cross-linked PML polymer having the structure (9)

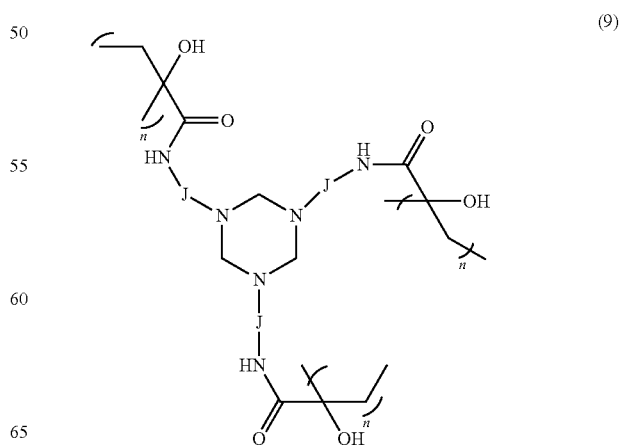

comprising three PML chains cross-linked by a hexahydrotriazine linkage in the case of a divalent bridging group J, and the result of reaction [4] yields

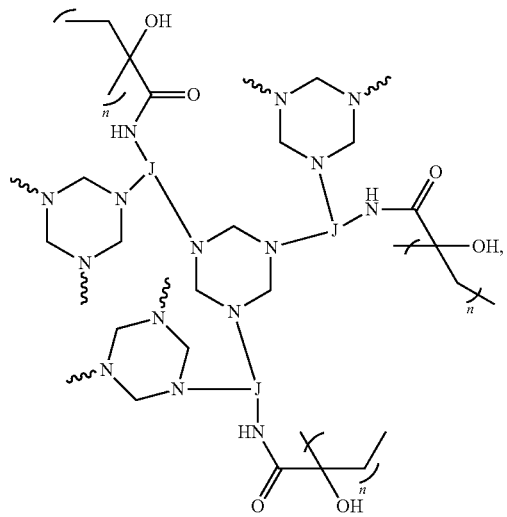

in the case of a trivalent bridging group J, comprising a plurality of hexahydrotriazine repeat units linked by bridging groups J, each with a pendant PML chain. A mixture of the PHA and PHT structures can result if the PHA is incompletely converted to PHT.

In general, the cross-link density of structure (10) is higher than that of structure (9). If the molecular weight of bridging group J is much smaller than that of the PML linkages, the cross-link density of structure (10) is approximately twice that of structure (9). The cross-link density can be varied between that of structure (9) and that of structure (10) by using a mixture of divalent and trivalent monomers. Monoamine monomers can also be used to control cross-link density, as further described below. The cross-link density can also be reduced after formation by partially depolymerizing the hexahydrotriazine links using a short acid treatment. For example, the polymer, while in solvent, can be exposed to a strong acid such as nitric acid for a short time (for example by neutralizing the acid after a few seconds) to depolymerize a portion of the hexahydrotriazine rings, thus reducing the cross-linking of the polymer.

As noted above, the bridging groups J can be divalent or trivalent. The bridging groups J may have at least one 6-carbon aromatic ring. A category of such bridging groups may have a structure, as follows:

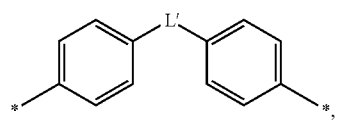

wherein L' is selected from the group consisting of —O—, —S—, —N(R')—, —N(H)—, —R"—, and combinations thereof, and R' and R" independently comprise at least 1 carbon. R' and R" can be independently selected from the group consisting of methyl, ethyl, propyl, isopropyl, phenyl, and combinations thereof. Other L' groups include methylene (—CH$_2$—), isopropylidenyl (—C(Me)$_2$-), and fluorenylidenyl

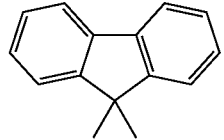

Trivalent bridging groups J include the following:

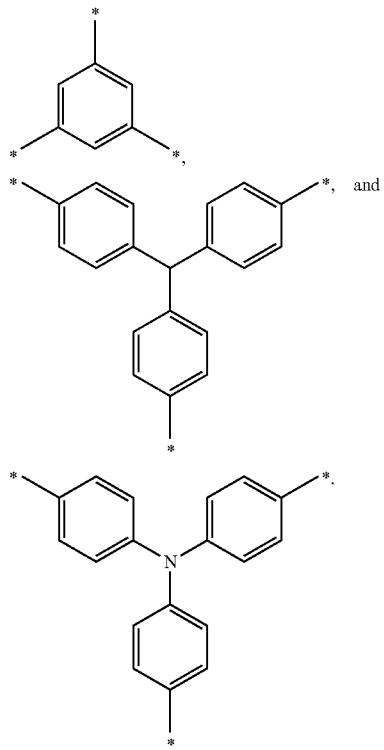

In one example, L' is —O—, and the monomer is 4,4'-oxydianiline ("ODA"). When excess ODA is reacted with PML, in an appropriate solvent such as NMP, a polymethylene lactide polymer results that has oxydianiline pendant groups attached to the main polymer chain, as follows:

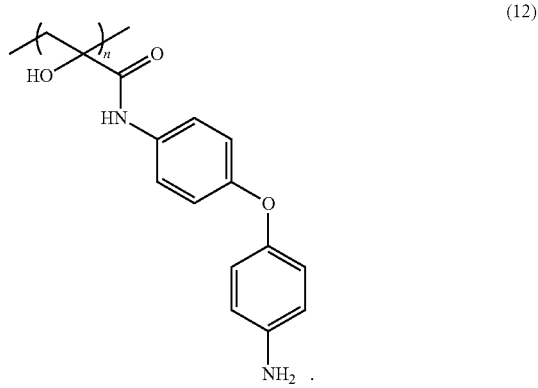

Structure (12) is a product of reaction [2], and therefore an example of structure (16), where J is an oxydiphenyl group and y is 2. Such a polymer may be called a poly(2-hydroxy-2-p-(p-aminophenoxy)phenylamido)trimethylene. When subsequently reacted with a formaldehyde, according to reaction [3], a PHT polymer is formed with the following structure:

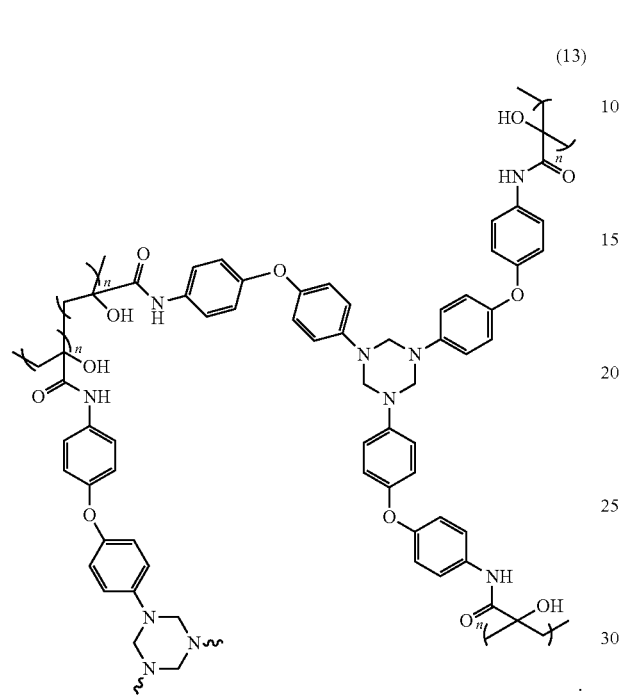

(13)

The wavy bonds in structure (13) indicate bond sites for attaching to other parts of the chemical network. As noted above, the reaction proceeds through the PHA stage, and with enough time and/or temperature reaches the PHT stage and structure (13).

Structure (13) is representative of a polymer network, so the entire network is not shown. The structure (13) includes a representative PML chain linked to two oxydianiline bridging groups to illustrate the structure of such linkages, and to show that the structure (13) is not only a polymethylene polymer, but is also a PHT polymer. In the structure (13), PML chains are linked by a plurality of oxydianiline bridging groups to hexahydrotriazine units. Each hexahydrotriazine repeat unit is linked by three oxydianiline bridging groups to three PML chains, and each PML chain is linked by one or more oxydianiline bridging groups to hexahydrotriazine centers, where there is a three-to-one mapping of oxydianiline bridging groups to hexahydrotriazine centers. The structure (13) may be thought of as a polymethylene polymer (i.e. a poly(2-hydroxytrimethylene)) cross-linked by tri-N-oxydianiline hexahydrotriazine cross-links.

As noted above, the bridging groups may be other types, and mixtures of bridging groups may be used. Non-limiting exemplary monomers comprising two primary aromatic amine groups include 4,4'-oxydianiline (ODA), 4,4'-methylenedianiline (MDA), 4,4'-(9-fluorenylidene)dianiline (FDA), p-phenylenediamine (PD), 1,8-diaminonaphthalene (18DAN), 1,4-diaminonaphthalene (14DAN), and benzidene, which have the following structures:

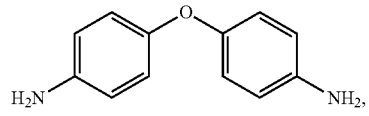
(ODA)

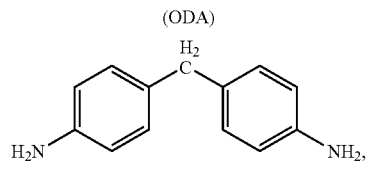
(MDA)

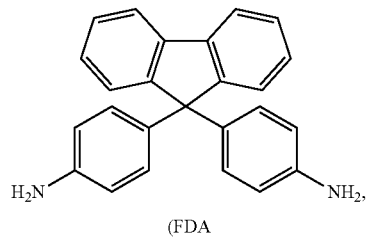
(FDA)

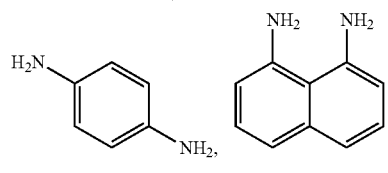
(PD)   (15DAN)

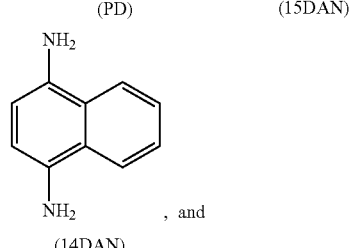
(14DAN)   , and

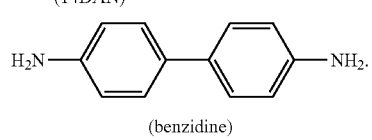
(benzidine)

Additionally, diluent groups may also be included that do not link at two ends and serve as termini for the polymer network. Such groups may be used to adjust cross-link density and molecular weight of the polymer network. Diluent groups, and mixtures of diluent groups, may be included in the network by including monoamine precursors in the reaction mixture for making the PHT or PHA network. The diluent groups are monovalent groups that can attach to hexahydrotriazine or hemiaminal groups without extending polymerization. Exemplary diluent groups include the following structures:

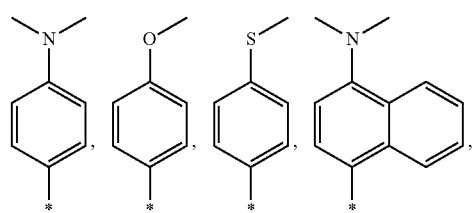

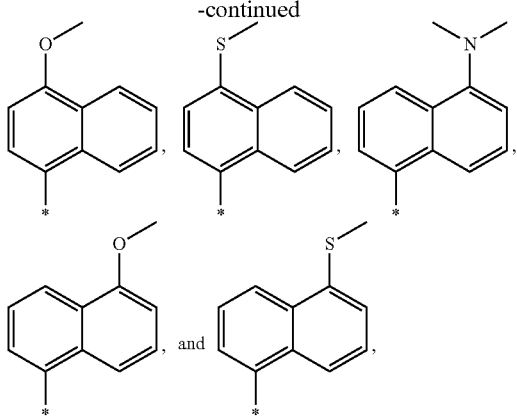

where the starred bonds represent bonds to a nitrogen atom in a hexahydrotriazine group or a hemiaminal group. Non-limiting exemplary diluent monomers include N,N-dimethyl-p-phenylenediamine (DPD), p-methoxyaniline (MOA), p-(methylthio)aniline (MTA), N,N-dimethyl-1,5-diaminonaphthalene (15DMN), N,N-dimethyl-1,4-diaminonaphthalene (14DMN), and N,N-dimethylbenzidene (DMB), which have the following structures:

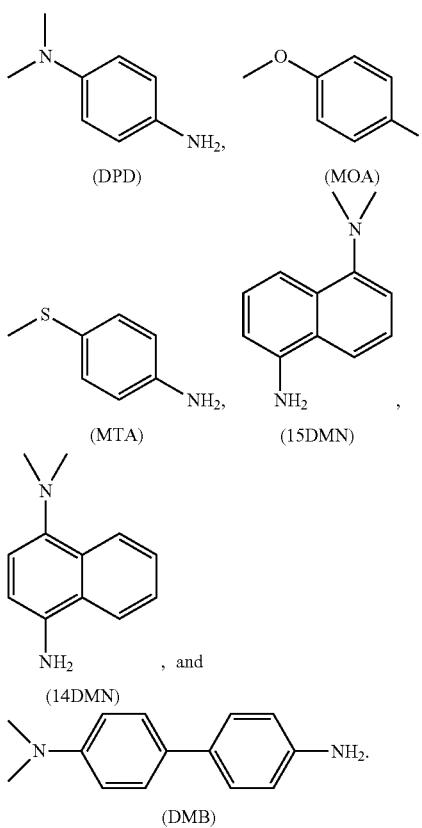

As noted above, such monomers can be used to control cross-link density in a PHT/PHA/PML polymer network.

Reactions [2]-[4] above describe adding an amine monomer to PML to form a precursor to the PHA/PHT reaction. In a variation, the amine monomer can be added to the formaldehyde, and the cyclopolymerization reaction can be started to form a PHA network, also sometimes referred to as a hemiaminal dynamic covalent network ("HDCN"), and then the PML polymer can be added to react with terminal amine groups in the HDCN to form a structure related to structure (13). In this embodiment, regions of "pure" HDCN grow to a certain size before the PML is added, and then the HDCN regions are linked together, or the link density of the network is increased, by the PML reacting with terminal amine groups along the surface of the HDCN. In this way, a HDCN gel can be strengthened and/or hardened by means other than driving the reaction to the PHT stage. As noted above, in addition to linking PML into the network, the HDCN can be partially converted to PHT.

Reaction [2] above may produce additional structures that can participate in the PHA/PHT reaction. In addition to the poly (hydroxyamidotrimethylene) structure (16) shown in reaction [2], the following related structures may also be products of reaction [2]:

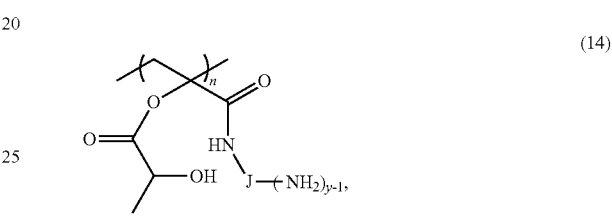

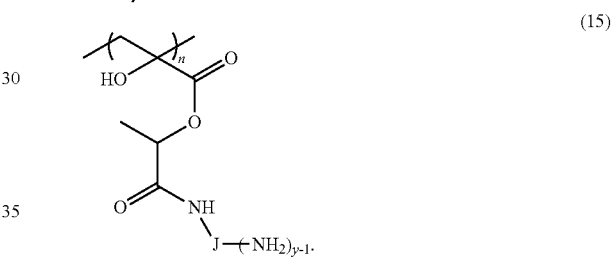

Structure (14) is an additional structure resulting from the ring-opening of reaction [2] at the 2 position of the pendant lactide (defining the 1 position as the attachment point of the lactide to the polymethylene polymer) while structure (15) is the additional structure from ring-opening at the 5 position of the pendant lactide. Structures (14) and (15) result from incomplete debonding of lactic acid during reaction [2] after nucleophilic acyl substitution at either acyl site (2 position or 5 position) of the lactide ring, and generally exist in equilibrium with structure (16) in reaction [2]. Higher temperature typically boosts concentration of structure (16) in the mixture. It should be noted that although these structures are depicted, for simplicity, as block structures, it is believed that structures (14) and (15) would each likely be a random multi-polymer of various combinations of substituents, including for example the structures of (14), (15), and (16) in a single polymer molecule, since some of the lactide pendant groups in a single PML molecule will react incompletely at the 2 position, some at the 5 position, and some will completely react to structure (16). Structures (14) and (15) may participate directly in the PHA/PHT reaction as byproducts of reaction [2], along with structure (16), or the structures may be hydrolyzed or otherwise converted into the structure (16) for example by reaction with a hydroxyl group liberated by lactide ring opening. In the examples of structures (12) and (13), expanded to include structures (13) and (14), the following structure is representative of the kind of network that can be formed:

(17)

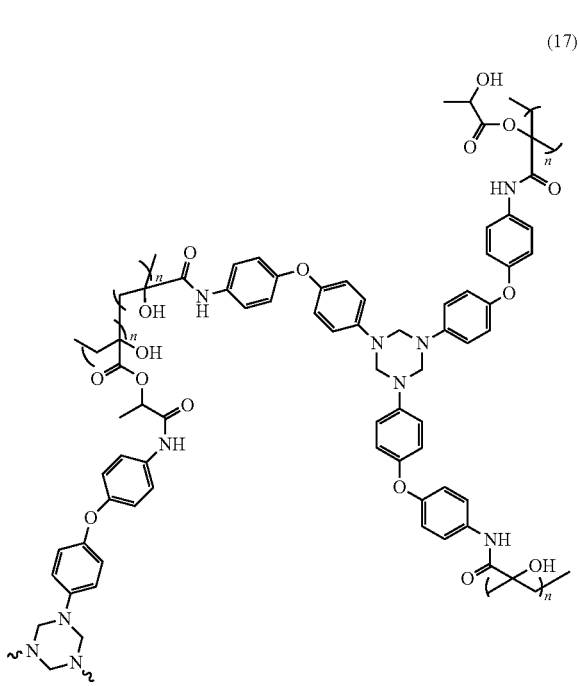

The resulting polymer network may thus be a mixed poly(acrylate)-poly(acrylamide) polymer cross-linked with PHT and/or PHA groups. Poly(methylene) lactide polymers are thus cross-linked by bridging groups that include N—C—N bonds. Such polymer networks can be tuned to have targeted properties by varying the PHT/PHA content and cross-linking density through stoichiometry and/or post-modification of the polymer. Such polymer networks can also be depolymerized in whole or part by exposure to acid or base, and the resulting monomers can be repolymerized using the same mechanisms according to the same recipe or a different recipe.

Other types of bridging groups may also be used in the systems described above. For example, various types of polymers may be amine-terminated and used as bridging groups. The polymer bridging groups may be added by obtaining a diamine terminated polymer, such as a diamine terminated vinyl polymer, a diamine terminated polyether, a diamine terminated polyester, a diamine terminated star polymer, a diamine terminated polyaryl ether sulfone, a diamine terminated polybenzoxazole polymer, a diamine terminated polybenimidazole polymer, a diamine terminated epoxy resin, a diamine terminated polysiloxane polymer, a diamine terminated polybutadiene polymer, and a diamine terminated butadiene copolymer. Diamine terminated polyethers are commercially available from suppliers such as Huntsman Corp. Diamine terminated vinyl polymers include long-chain alkyl diamines which may be referred to as polyalkylene diamines, for example polyethylene diamine, polypropylene diamine, and other such polymer diamines. Diamine terminated vinyl polymers also include long-chain polymer diamines with cyclic and/or aromatic components, such as diamine terminated polystyrene. The diamine terminated polymers and oligomers referred to above are commercially available, or may be readily synthesized through well-known reaction pathways. Solvent content can be used to adjust viscosity of the reaction mixture if necessary.

The embodiments described above use PML polymers to form PHA/PHT cross-linked polymer networks. As noted above, these are based on the acyl functionalities in the lactide dimer. Lactones also have acyl structures that can participate in similar reactions. Lactones are cyclic esters of hydroxy carboxylic acids containing a 1-oxacycloalkan-2-one structure. Lactones with 4, 5, and 6 carbon atoms in the lactone ring, having the following structure,

(18)

where n, for purposes of the lactone discussion here and following, is 1-3 and R is, independently in each instance, hydrogen or a linear, branched, or cyclic carbon-hydrogen group that is aliphatic or aromatic, can be used to make polymer networks using reactions similar to those described therein, along with other supporting reactions. A lactone of structure (18) may be methylated at the α position to the carbonyl group using enol chemistry, and then allylated according to reaction [1] and polymerized using AIBN, as follows:

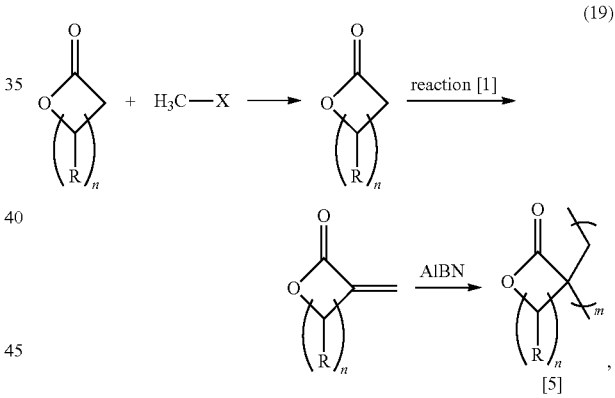

(19)

where m is an integer of at least 1. Structure (19) can then be aminated according to reaction [2], as follows:

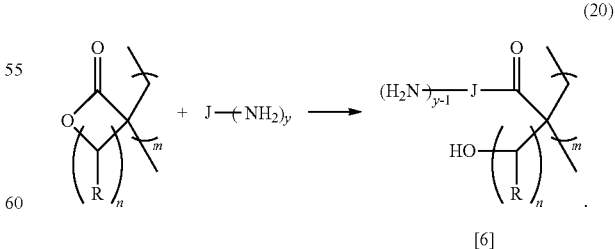

(20)

Structure (20) may be referred to as a poly(methylidenelactone). As above, the resulting structure can be cyclopolymerized with formaldehyde to form a PHA/PHT/poly(methylidenelactone) network structure analogous to structures (9), (10), and (13). Examples of lactones for which the foregoing reactions will result in PHA/PHT/poly(methylidenelactone) polymer networks include propano-3-lactone (a.k.a. propiolactone), butano-4-lactone (a.k.a. butyrolactone), pentano-5-lactone (a.k.a. valerolactone), and hexane-6-lactone (a.k.a. caprolactone), and alkylated derivatives thereof (e.g. α, β, γ, δ, ε-lactones, and alkylated derivatives of these, as well).

Additionally, other monomers can be added to the various PHA/PHT reactions described above to extend the polymer network to include other linkage varieties. When reacting the amines of structures (3), (12), (14), (15), (16), and amine derivatives thereof described herein, with formaldehydes, other monomers that can react with amine groups and hydroxyl groups can be included in the reaction mixture. Examples include isocyanates, which react with hydroxyl groups to form carbamate or urethane linkages, acrylates and acrylic acids, which react with hydroxyl groups and can be further used for orthogonal cross-linking through the acrylate C=C double-bond, other carboxylic and polycarboxylic acids, which react with amine groups and hydroxyl groups to form amide and ester linkages, and bis(cyclic carbonates), which react with amine groups at both ends to form carbamate linkages, and bis(epoxides), which react with hydroxyl groups at both ends to form ether linkages or also react with amine groups at both ends to produce amine linkages with secondary hydroxyl groups.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

While the foregoing is directed to embodiments of the present invention, other and further embodiments of the invention may be devised without departing from the basic scope thereof, and the scope thereof is determined by the claims that follow.

What is claimed is:

1. A composition, comprising:
a poly(methylene lactide) polymer covalently linked to a hexahydrotriazine unit having the structure

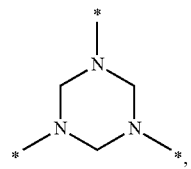

a hemiaminal unit having the structure

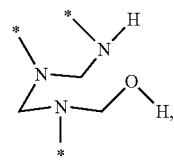

or combinations thereof, wherein at least one starred bond of the hexahydrotriazine unit, the hemiaminal unit, or combinations thereof represents a connection to a bridging group.

2. The composition of claim 1, wherein the poly(methylene lactide) polymer is covalently linked to a plurality of hexahydrotriazine units, a plurality of hemiaminal units, or combinations thereof.

3. The composition of claim 2, wherein the poly(methylene lactide) polymer comprises a plurality of poly(methylene lactide) chains, and at least a portion of the poly(methylene lactide) chains are cross-linked by one or more of the hexahydrotriazine units, the hemiaminal units, or combinations thereof.

4. The composition of claim 2, wherein each poly(methylene lactide) polymer is linked to a hexahydrotriazine unit or a hemiaminal unit by a bridging group.

5. The composition of claim 4, wherein each bridging group is divalent or trivalent, and each bridging group is aromatic.

6. The composition of claim 1, wherein the bridging group is divalent or trivalent and the bridging group is aromatic.

7. The composition of claim 6, wherein the bridging group is an oxydianiline group.

8. A composition, comprising:
a poly(methylene lactide) polymer covalently linked to a poly(hexahydrotriazine), a poly(hemiaminal), or combinations thereof, by an aromatic bridging group, wherein:
the poly(hexahydrotriazine) is a material having a plurality of hexahydrotriazine units having the structure

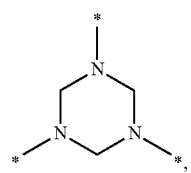

the poly(hemiaminal) polymer is a material having a plurality of hemiaminal units having the structure

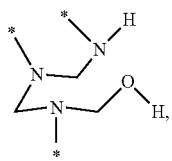

and
at least one starred bond of the hexahydrotriazine unit or the hemiaminal unit represents a connection to the aromatic bridging group.

9. The composition of claim 8, wherein the aromatic bridging group is divalent or trivalent.

10. The composition of claim 8, wherein the poly(methylene lactide) polymer is covalently linked by a plurality of aromatic bridging groups.

11. The composition of claim 10, wherein the plurality of the aromatic bridging groups is the same or different aromatic bridging group.

12. The composition of claim 10, wherein each aromatic bridging group is divalent.

13. A composition, comprising:
a poly(methylene lactide) polymer covalently linked to a hexahydrotriazine unit, wherein the hexahydrotriazine unit has the structure

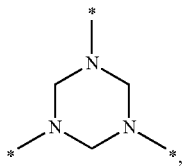

and wherein at least one starred bond represents a connection to an aromatic bridging group.

14. The composition of claim 13, wherein the poly(methylene lactide) polymer is covalently linked to a plurality of hexahydrotriazine units, wherein each hexahydrotriazine unit has the structure

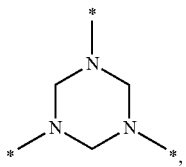

and
wherein at least one starred bond represents a connection to an aromatic bridging group.

15. The composition of claim 14, wherein the poly(methylene lactide) polymer comprises a plurality of poly(methylene lactide) chains, and at least a portion of the poly(methylene lactide) chains are cross-linked by one or more of the hexahydrotriazine units.

16. The composition of claim 13, wherein the aromatic bridging group is divalent.

17. The composition of claim 13, wherein the aromatic bridging group is trivalent.

* * * * *